US005104524A

United States Patent [19]

Eiben et al.

[11] Patent Number: 5,104,524

[45] Date of Patent: Apr. 14, 1992

[54] APPARATUS FOR WASHING A SOLVENT IN THE REPROCESSING OF IRRADIATED NUCLEAR FUELS

[75] Inventors: Klaus Eiben, Ettlingen; Heinz Evers, Busenberg, both of Fed. Rep. of Germany

[73] Assignee: Deutsche Gesellschaft für Wiederaufarbeitung von Kernbrennstoffen GmbH, Hanover, Fed. Rep. of Germany

[21] Appl. No.: 550,903

[22] Filed: Jul. 11, 1990

Related U.S. Application Data

[63] Continuation-in-part of Ser. No. 195,272, May 18, 1988, Pat. No. 4,941,998.

[30] Foreign Application Priority Data

Jun. 1, 1987 [DE] Fed. Rep. of Germany ....... 3718338

[51] Int. Cl.[5] .............................................. B01D 11/04

[52] U.S. Cl. ...................................... 210/85; 210/96.1; 210/143; 210/195.1; 210/198.1; 210/248; 210/259; 210/511; 210/519; 210/521; 210/743; 366/152; 366/160; 366/169; 366/292; 422/111; 422/159; 422/225; 422/256; 422/259

[58] Field of Search ............... 422/110, 111, 159, 258, 422/259, 225, 256; 210/85, 197, 248, 511, 743, 143, 519, 195.1, 96.1, 521, 258, 259, 198.1, 201; 366/151, 169, 152, 160, 292; 252/627, 631; 423/8-10; 376/310, 311

[56] References Cited

U.S. PATENT DOCUMENTS

| | | | |
|---|---|---|---|
| 1,943,684 | 1/1934 | Martin et al. | 210/743 |
| 3,489,526 | 1/1970 | Roy et al. | 422/259 |
| 3,544,079 | 12/1970 | Dressler | 422/258 |
| 3,663,178 | 5/1972 | Miller et al. | 422/259 |
| 3,899,294 | 8/1975 | Magiros | 210/743 |
| 4,271,128 | 6/1981 | Schrodter et al. | 422/258 |
| 4,292,277 | 9/1981 | Bonney et al. | 210/511 |
| 4,762,796 | 8/1988 | Weber et al. | 422/111 |

FOREIGN PATENT DOCUMENTS

| | | | |
|---|---|---|---|
| 2226100 | 10/1987 | Japan | 210/743 |
| 1087198 | 10/1967 | United Kingdom | 422/258 |

*Primary Examiner*—Frank Spear
*Assistant Examiner*—Joseph Drodge
*Attorney, Agent, or Firm*—Walter Ottesen

[57] ABSTRACT

The invention is directed to an apparatus for washing a solvent in the reprocessing of irradiated nuclear fuel. The solvent is washed with an aqueous solution in a mixer-settler having at least one stage which includes a mixing chamber and a settling chamber. The pH is measured by a sensor adjacent stirring means in the mixing chamber and is coupled to a controller controlling metering of the washing solution. The pH of the dispersion in the mixing chamber is measured and an amount of washing solution is added which influences the pH toward the desired operational value. Various recycling means and weir overflow means also influence pH control and the washing operation.

15 Claims, 4 Drawing Sheets

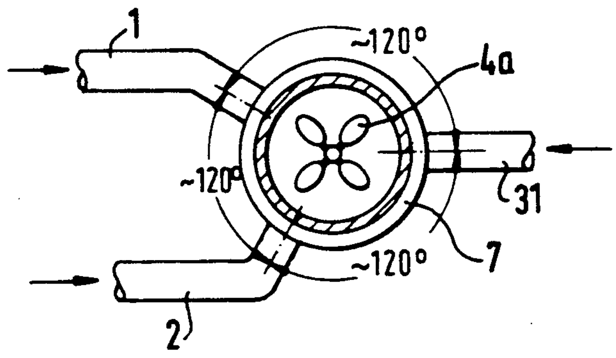
Fig. 4
Fig. 5
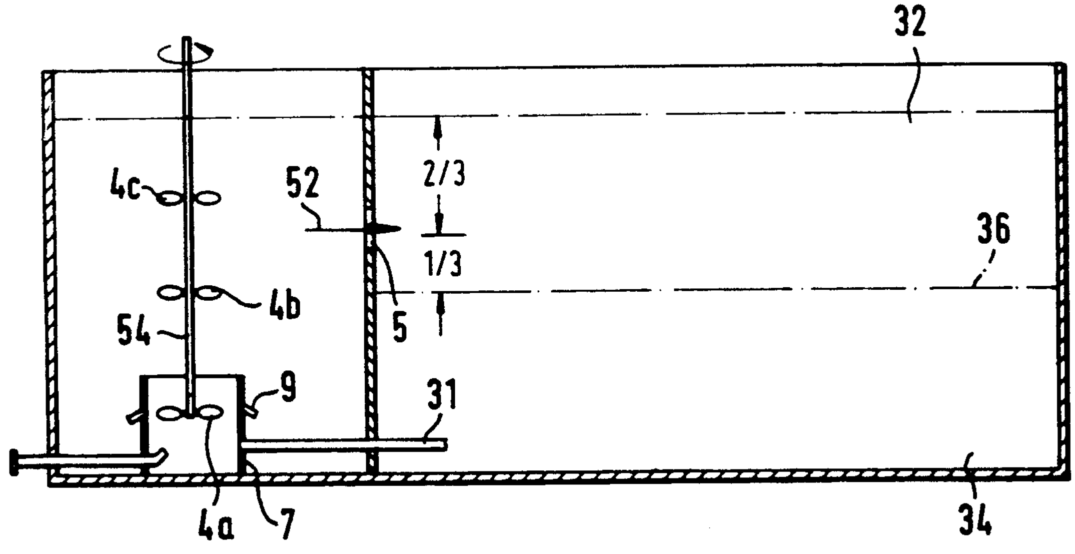

APPARATUS FOR WASHING A SOLVENT IN THE REPROCESSING OF IRRADIATED NUCLEAR FUELS

RELATED APPLICATION

This is a continuation-in-part of application Ser. No. 195,272, now U.S. Pat. No. 4,941,998 issued on July 17, 1990 filed on May 18, 1988 and entitled "Method of Washing a Solvent in the Reprocessing of Irradiated Nuclear Fuels".

FIELD OF THE INVENTION

The invention relates to an apparatus for washing a solvent in the reprocessing of irradiated nuclear fuels. The solvent is washed in a mixer-settler with an aqueous solution and the mixer-settler has one or more stages.

BACKGROUND OF THE INVENTION

The PUREX process has become established in the reprocessing of irradiated nuclear fuels and reference can be made to the journal "Zeitschrift Atomkernenergie - Kerntechnik", volume 35, (1980) issue 2, pages 81 to 93. Page 87 of this issue discloses that organic solvents can be washed to remove the degradation products contained therein. The solvent should be passed in circulation and must therefore pass through this solvent washing. Soluble impurities and decomposition products are removed from the solvent by alkaline washing with sodium carbonate solution. In this connection, reference can be made to "Zeitschrift Atomwirtschaft - Atomtechnik", volume 26, Number 3, March 1981.

The PUREX process uses an organic solvent (preferably 30 volume percent TBP in dodecane), which is partly hydrolyzed by the contact with acid solutions and is partly decomposed radiolytically by the radioactive radiation during the reprocessing process. These acid decomposition products are washed out by a single-stage and/or multi-stage alkaline/acid washing before recycling of the solvent. Sodium carbonate ($Na_2CO_3$) in the form of an aqueous solution is often used as the washing solution, and as spent washing solution chiefly contributes, after evaporation, to the salt load ($NaNO_3$) of the moderately active waste (MAW) of a reprocessing facility. The alkaline washing solutions do not remain in use until they are neutralized, since otherwise certain metal complex compounds are hydrolyzed and precipitate.

Sodium carbonate solutions or sodium hydroxide solution have usually been chosen as the washing solution for the organic solvent, and have always been introduced in excess, assuming the most unfavorable conditions. It has been found here that only 10% of the washing agent is available for breaking down the degradation products in the organic solvent, since up to 90% is consumed by secondary reactions. These secondary reactions are caused by the entrained acids and heavy metals, such as uranium which are complexed by the sodium carbonate solution and remain in the solution.

A process for solvent washing in which the solvent is washed with an aqueous hydrazine hydrate solution with a molar concentration of the order of 0.1-1.0 is known from German patent publication DE 24 49 589 C2. The moderately active waste occurring as a result of the washing solution is thereby said to be reduced by a factor of 100. From the point of view of a reduction in the waste, the solvent washing is subjected to discontinuous checking.

The use of hydrazine hydrate solution has considerable disadvantages for the further processing of the hydrazine waste. An additional process is necessary before evaporation of the aqueous waste. The hydrazine must be destroyed by electrolytic oxidation. This electrolytic oxidation, however, can only be carried out if the hydrazine waste is first rendered strongly acid. The organic phase still present can thereby be separated out. In this solvent washing also, the hydrazine hydrate must be added in excess.

Such solvent washings are predominantly carried out in so-called mixer-settlers. Such mixer-settlers, which can be built up from one or more stages, are known from German patent publications DE-AS 26 24 936 and DE-PS 29 24 458. It is a characteristic feature of these mixer-settlers that each stage comprises a mixing chamber and a settling chamber in cascade therewith for separating the phases which have been mixed with one another.

SUMMARY OF THE INVENTION

It is an object of the invention to improve an apparatus of the type described above so that it becomes possible to minimize the amount of salt of the moderately active waste resulting from the spent washing solution.

The apparatus of the invention is for washing a solvent in the reprocessing of irradiated nuclear fuels. The apparatus includes: a mixer-settler wherein two phases are mixed; the mixer-settler including: a mixing chamber; and, a settling chamber adjacent the mixing chamber; solvent supply means for supplying the solvent to be washed to the mixing chamber as one of the phases; aqueous washing solution supply means for supplying an aqueous washing solution to the mixing chamber as the other one of the phases; recycling means arranged in the region of the phase defined by the aqueous washing solution for recycling a portion of the latter between the chambers; pH sensor means for sensing the pH of the dispersion of the phases in the mixing chamber and for supplying a sensor signal indicative of the pH; and, controller means electrically connected to the sensor means for controlling the supply of aqueous washing solution to the mixing chamber for maintaining the pH within a predetermined range.

The operational variations in the nature and amount of the decomposition products can be reacted to directly in the course of the reaction by the pH-controlled addition of the washing solution. The addition of the washing agent can be limited to the washing agent actually required. The amount of washing solution or the concentration of the substance effective for washing action in the washing solution is adjusted to the degree of contamination of the washing solution. The pH provides a continuous signal as to the instantaneous washing quality of the washing solution.

The apparatus according to the invention can be used for alkaline washing and also for acid washing. In acid washing, the acid ($HNO_3$) is metered in as washing solution according to the actual requirement indicated by the pH measurement. In alkaline washing, a particular alkalinity range is an indication of the good washing effect of the washing solution. The hydrogen ion concentration in the alkaline solution is very low in order to achieve the alkaline washing effect. In acid washing, the hydrogen ion concentration is very high, which is expressed by the low pH which is sought.

As disclosed in U.S. Pat. No. 4,188,361, it is known from the processing of uranium ore to separate organically extractable uranium complexes in a mixer-settler battery by a pH-controlled addition of a base such as ammonia. This procedure in the neighboring field of processing of uranium ore has still not had any influence in the field of reprocessing of nuclear fuels, even though this technique has been practiced for more than thirty years. A transfer to reprocessing has not been undertaken because of the inaccessibility of the mixer-settlers because of radiation. There are considerable difficulties in maintaining in-line instruments in this area. Ever more value has been placed on the reliable removal of the decomposition products from organic solvents in reprocessing technology with the reduction in the salt load assuming importance and therefore leading to the use of washing agents low in salt, such as hydrazine hydrate. This problem is not to be found in U.S. Pat. No. 4,188,361.

In an advantageous embodiment of the invention, the aqueous washing phase from the settling chamber of the mixer-settler is recycled in part in the mixing chamber. A good effect of the solvent washing is achieved by this procedure.

According to another advantageous embodiment of the invention, the internal phase ratio between the solvent and washing solution is adjusted to almost 1:1. The internal phase ratio of 1:1, at which a stable phase situation is present, can be established via the amount of the recycled washing solution. The organic solvent phase to be washed is thereby dispersed and the aqueous washing solution is present as a continuous phase. This stable phase situation prevents the aqueous phase from being carried with the washed organic phase from the settling chamber of the alkaline washing stage into the next washing stage, the latter being usually acid.

The invention also relates to an apparatus for carrying out the method of the invention. The actual requirement of washing agent is determined by the pH measuring probe and the washing agent concentration is thus monitored. If the pH leaves the threshold value range, the requirement of alkaline or acid washing agents is subsequently adjusted by the control loop containing the metering pumps.

In an advantageous embodiment of the apparatus, the mixer-settler has two or more washing stages with alkaline and acid washing stages alternating with each other.

In a further advantageous embodiment, the amount of the washing phase for recycling from the settling chamber can be influenced via the speed of the stirrer.

As a consequence of the invention, it is possible to avoid the previously necessary addition of the washing solution, for example of the sodium carbonate, which is far in excess of the actual requirement, for removing and neutralizing the decomposition products. By a controlled metered addition of the washing agent, only the actual requirement is adjusted to the particular operating conditions. The previous procedure in which an amount of $Na_2CO_3$ solution always had to be introduced in excess by a permanently set external phase ratio, assuming the most unfavorable conditions, can now be avoided. The requirement of washing agent is determined directly at the place where it is required and not at the location where the washing agent is discharged.

BRIEF DESCRIPTION OF THE DRAWING

The invention will now be described with reference to the drawings wherein:

FIG. 4 is a section view taken along line IV-13 IV of FIG. 3 and shows the arrangement of lines connected to the head of the stirrer assembly; and, FIG. 5 is a side elevation section view of the first stage of the two-stage mixer-settler.

DESCRIPTION OF THE PREFERRED EMBODIMENTS OF THE INVENTION

Figure 1:
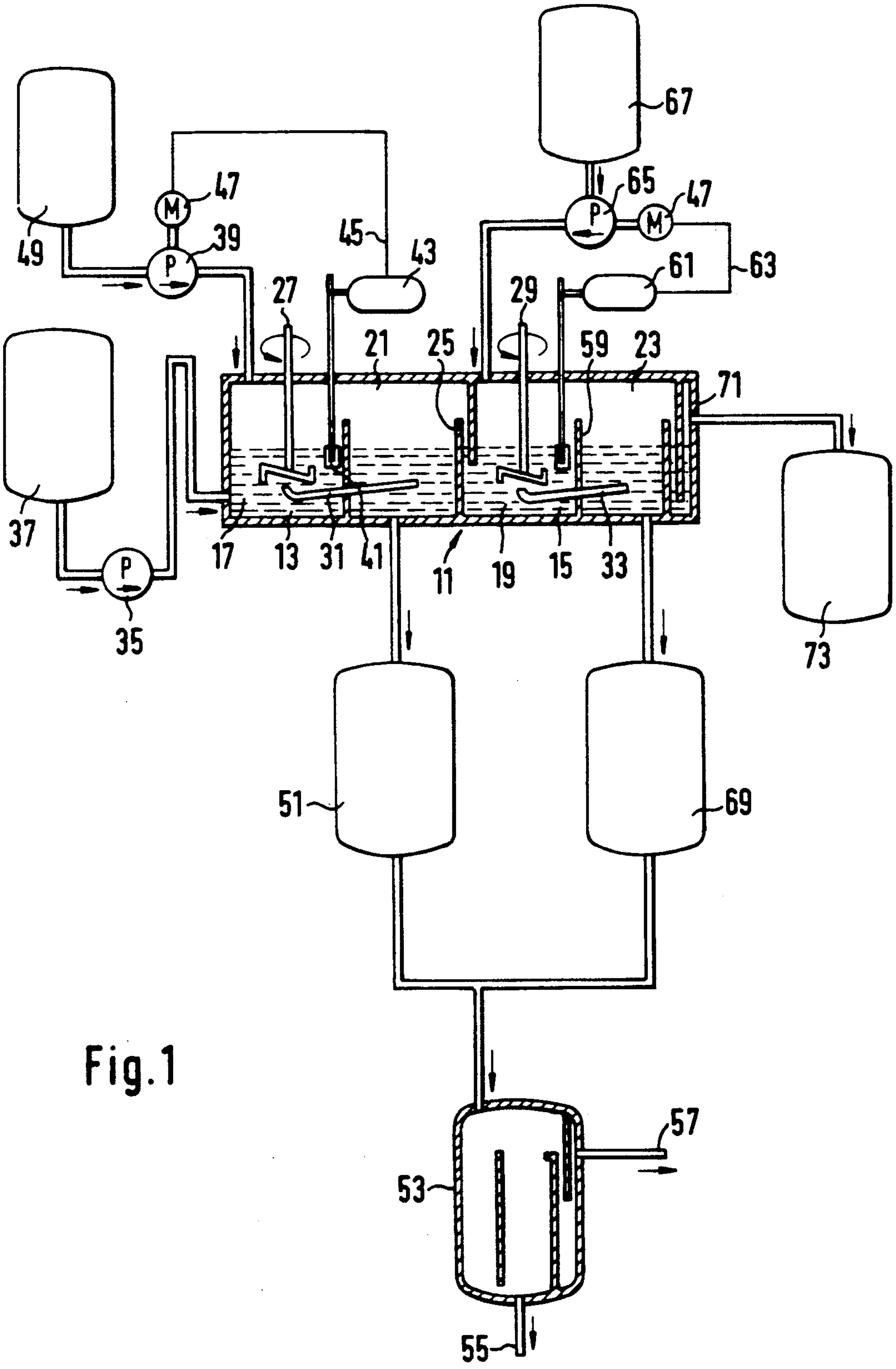
FIG. 1 is a schematic of an embodiment of an apparatus according to the invention for washing a solvent in the reprocessing of irradiated nuclear fuel.

A two-stage mixer-settler 11 has a first washing stage 13 which includes a mixing chamber 17 and a follow-on settling chamber 21 and a second washing stage 15 which includes a mixing chamber 19 and a follow-on settling chamber 23. The lighter organic phase is transported from the first washing stage 13 over a weir 25 into the second washing stage 15. The mixing chambers (17, 19) contain respective stirrers (27, 29). A recycling line 31 recycles the washing phase from the settling chamber 21 into the mixing chamber 17 and ends beneath the stirrer 27. Likewise, a recycling line 33 recycles the washing phase from the settling chamber 23 into the mixing chamber 19 and ends beneath the stirrer 29.

The organic solvent to be washed is fed to the mixer-settler 11 from a reservoir tank 37 via a metering pump 35 into the mixing chamber 17, into which an alkaline washing solution is also introduced in a concentration range of from 0.1 to 0.5 mol/liter $Na_2CO_3$. This is effected via an in-line metering pump 39. A ph measuring probe 41 is located in the mixing chamber 17 and is connected to a constant-value controller 43 which acts via its output 45 on an actuator (motor 47) of the metering pump 39 in response to deviations in the range specified of between ph 8.5 and 10, so that the amount of sodium carbonate is added from a reservoir tank 49 until the pH is adjusted again to within the range specified.

Alkaline washing solution is drawn off at the bottom of the settling chamber 21 of the first washing stage 13 of the mixer-settler 11 and conveyed into a storage tank 51.

The second washing stage 15 of the mixer-settler 11 is configured for acid washing. For this, the acid washing solution for neutralization of the solution which has been subjected to alkaline washing is introduced in a concentration of 0.1 to 1.5 mol $HNO_3$. The pH in the mixing chamber 19 of the acid washing stage 15 is set in the range between pH 0 and 3. A pH measuring probe in the mixing chamber 19 delivers its signal as a control quantity to the constant-value controller 61. Via its output 63, the constant-value controller acts on the actuator (motor 47) of a metering pump 65 in the event of deviations in the range specified of between pH 0 and 3, so that the amount of acid ($HNO_3$) is added from the reservoir tank 67 until the pH has been adjusted again to within the range specified.

The acid washing solution is drawn off at the bottom of the settling chamber 23 and conveyed to an intermediate tank 69.

The spent alkaline and acid washing solutions present in the tanks 51 and 69 are mixed with one another. A new process product, which again has two phases, is produced by the reaction. The decomposition products are neutralized and released by the mixing operation. The decomposition products are dissolved in the separated organic phase. The mixed solution is introduced into a separator 53 for separation into aqueous moderately active waste 55 and organic moderately active waste 57. The discharge 71 of the mixer-settler 11 is located at the side thereof and the washed solvent is here introduced into a tank 73 for further recycling.

The internal phase ratio between the organic solvent (organic phase) and the washing solution (aqueous phase) is adjusted to almost 1:1 with a stable phase position. This can be achieved with a mixer-settler having a mixing chamber shown in FIG. 2.

The pH measurement is made in the mixing chamber during the washing of the organic solvent for metering the washing solution. For this purpose, it is necessary that the pH measuring probe 41 (see FIG. 1) is mounted in the mixing chamber so that it is always present in the electrically conductive phase (aqueous phase) without permitting the internal phase ratio of 1:1 to change. This phase ratio permits the waste flow to be charged with low quantities of salt.

Figure 2:
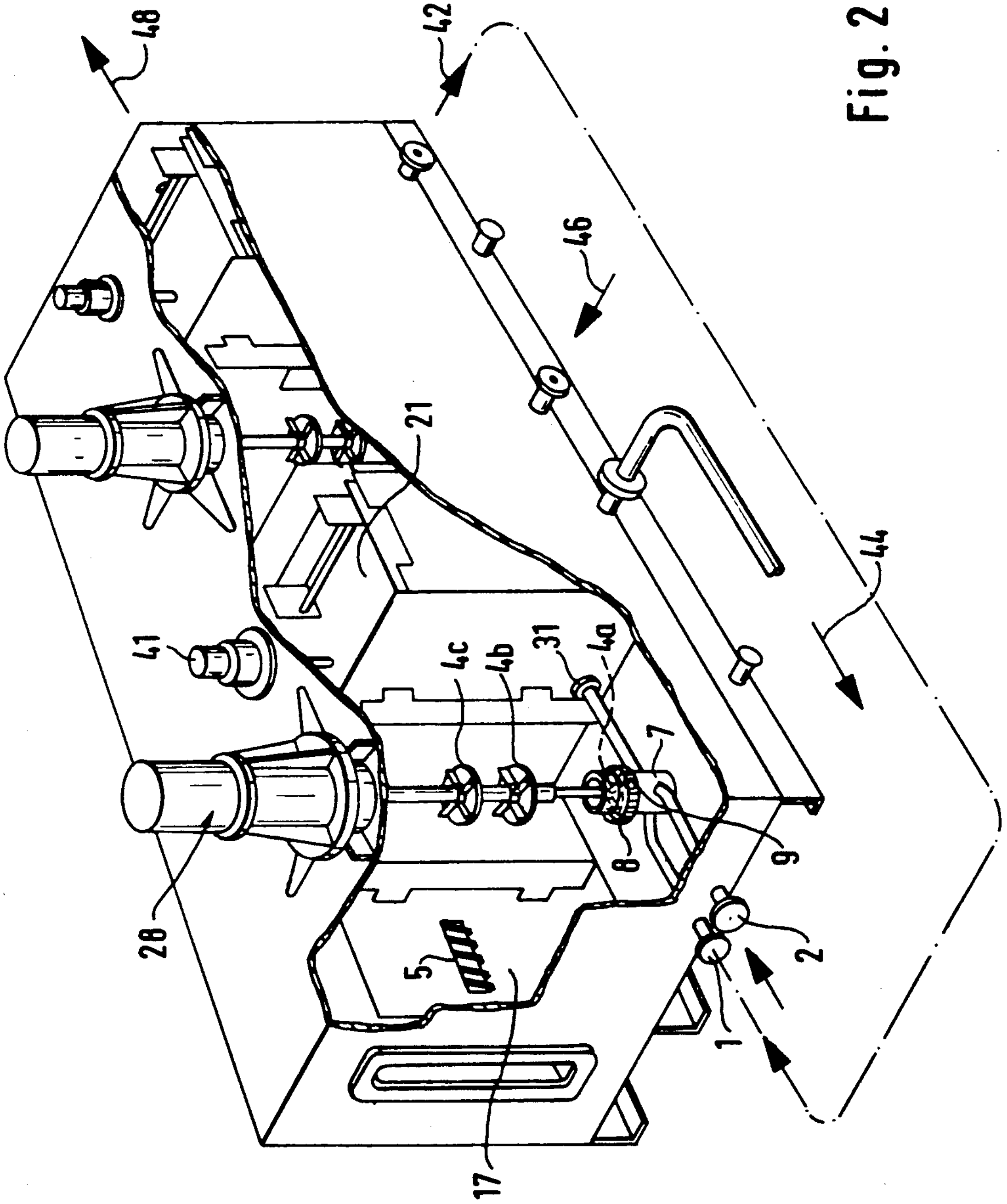
FIG. 2 is a perspective schematic of a two-stage mixer-settler with a portion of the wall of one of the mixing chambers broken away to show a stirrer assembly according to another embodiment of the invention.

Specific features of the mixing chamber of the mixer-settler are significant for achieving the desired phase ratio of 1:1 and these features will now be explained with reference to FIG. 2.

The aqueous and organic phases are supplied to the mixing chamber via conduit feed lines 1 and 2, respectively. The recycled aqueous phase from settling chamber 21 is supplied via the recycling line 31. The stirrer assembly 28 arranged in the mixing chamber 17 mixes the aqueous and organic phases with the recycled aqueous phase. Referring to FIG. 2, arrows 42 and 44 indicate aqueous phase discharges and arrow 48 indicates organic phase discharge.

Figure 3:
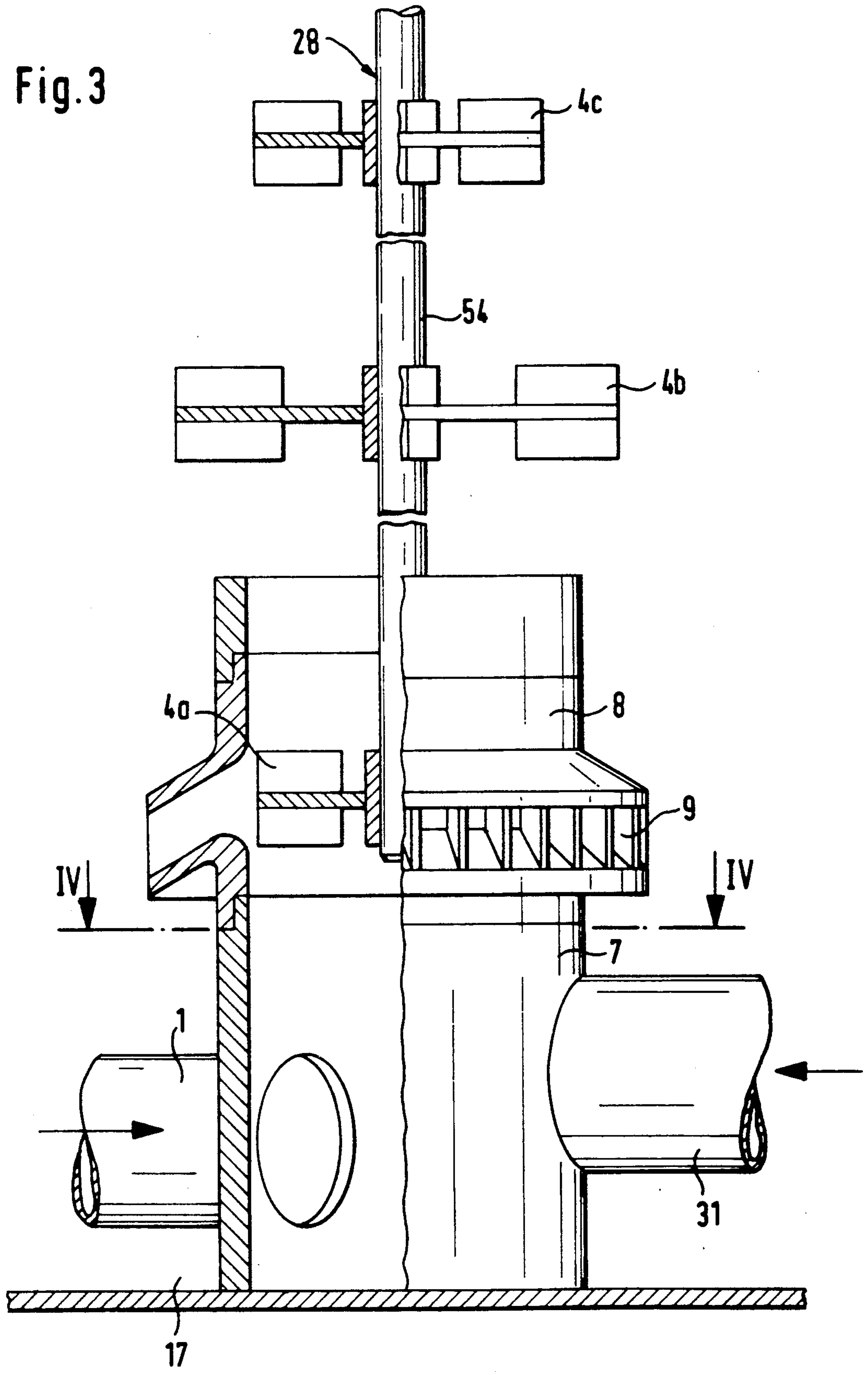
FIG. 3 is a side elevation view of the stirrer assembly of the mixing chamber exposed in FIG. 2 with the wall of the left-hand portion of the stirrer assembly broken away to allow a portion of the lower stirrer.

The stirrer assembly 28 includes a head 7 having connections for feed lines (1 and 2) and the recycling line 31 arranged in defined positions with respect to each other. A side elevation view of the stirrer assembly 28 is shown in FIG. 3 wherein only conduit feed line 1 and the recycling line 31 are shown. The three lines (1, 2, 31) are connected to head 7 at connecting locations spaced 120° one from the other as shown in FIG. 4. The feed lines (1, 2) are connected to the head 7 at an elevation somewhat lower than recycling line 31.

The stirrer assembly 28 includes a static diffuser 8 having diffuser channels 9 and provides a mixing circulation within the mixing chamber. The diffuser channels 9 are inclined downwardly as shown in FIG. 3 which improves the turbulence and mixing of the phases in the mixing chamber 17. The diffuser 8 and diffuser channels 9 are mounted above the head 7.

The stirrer assembly further includes three stirrers (4*a*, 4*b*, 4*c*) mounted on a shaft 54 of which the stirrer 4*a* is arranged within the static diffuser 8 at the elevation of the diffuser channels 9 above the head 7. The stirrer 4*a* acts as a suction stirrer for recycling the aqueous phase from the settling chamber 21 and for the circulation within the mixing chamber 17. The stirrer 4*a* mixes the inputs from the three lines (1, 2, 31) and forces them through the diffuser channels 9 and into the mixing chamber 17. The stirrers (4*b* and 4*c*) are disposed in the upper region of the mixing chamber as shown in FIG. 5 and effect a continuous thorough mixing in the upper region of the mixing chamber 17. The respective diameters and positions in elevation of the stirrers (4*b* and 4*c*) are in a predetermined relationship to each other and to the elevation of a mixing phase weir 5. The flow through weir 5 is indicated by arrow 52. The solvent phase 32 and the aqueous washing solution phase 34 conjointly define an interface 36 in the settling chamber 21 and the mixing phase weir 5 is disposed above this interface 36. As shown in FIG. 5, the weir 5 is at a depth of approximately $\frac{2}{3}$ of the solvent phase 32.

The clear cross section of the feed lines (1 and 2) as well as the clear cross section of the recycling line 31 and of the mixing phase weir 5 are dimensioned in dependence upon the throughput. In this way, the required throughput at an adjusted phase ratio of 1:1 is assured.

The rotational speed of the stirrer for recycling the quantity of aqueous phase from the settling chamber 21 into the mixing chamber 17, which is required for the adjustment of the phase ratio of 1:1, and for thoroughly mixing the phases in the mixing chamber can be adjusted within a predetermined rotational speed range.

The stirrers, the static diffuser and the mixing phase weir are all matched with respect to their position in elevation to the geometry of the mixing chamber.

With the above structural features, an operating optimum condition is obtained which assures a stable phase position having the optimal phase ratio of 1:1 and a continuous presence of the aqueous phase for the pH measurement.

It is understood that the foregoing description is that of the preferred embodiments of the invention and that various changes and modifications may be made thereto without departing from the spirit and scope of the invention as defined in the appended claims.

What is claimed is:

1. Apparatus for washing an organic solvent in the reprocessing of irradiated nuclear fuel, the apparatus comprising:

a mixer-settler having first and second stages wherein two phases are mixed and each stage having a bottom;

said first mixer-settler stage including a mixing chamber and a settling chamber and said second mixer-settler stage also including a mixing chamber and a settling chamber;

solvent metering means for metering a solvent to the mixing chamber of the first stage as one of the phases;

metering means for metering a quantity of a first aqueous washing solution into the first stage in the mixing chamber thereof as the other one of the phases to produce a dispersion of the phases with the dispersion having a pH value and with the aqueous solution collecting at the bottom of the first stage as a spent first aqueous washing solution;

pH sensor means for measuring pH values of the dispersion of said phases in said mixing chamber of the first stage to obtain a signal indicative of the pH values of the dispersion;

controller means for controlling quantities of the first aqueous washing solution metered to the mixing chamber of the first stage in response to said signal for maintaining said pH values within a predetermined range;

first discharge means for drawing off the first aqueous washing solution at the bottom of the first stage;

aqueous metering means for metering a second aqueous washing solution into the second stage in the mixing chamber thereof for neutralizing the solution which has been subjected to washing by said first aqueous washing solution with the second aqueous washing solution collecting at the bottom of the second stage as a spent second aqueous washing solution;

second discharge means for drawing off the second aqueous washing solution at the bottom of said second stage; and, mixing means for mixing the spent first and second aqueous washing solution to form a new process product in the form of a mixed solution which again has two phases.

2. The apparatus of claim 1, wherein said first aqueous washing solution is an alkaline washing solution and said second aqueous washing solution is an acid washing solution.

3. The apparatus of claim 2, comprising a separator connected to said mixing means for receiving said process product and for separating said process product into an aqueous waste and an organic waste.

4. The apparatus of claim 2, comprising a tank connected to said second stage for passing the washed solvent from the second stage of said mixer-settler into a tank for further recycling.

5. The apparatus of claim 2, wherein said solvent is an organic solvent.

6 Apparatus for washing an organic solvent in the reprocessing of irradiated nuclear fuel, the apparatus comprising:

a mixer-settler having first and second stages wherein two phases are mixed;

said first mixer-settler stage including a mixing chamber and a settling chamber and said second mixer-settler stage also including a mixing chamber and a settling chamber;

said first and second stages arranged next to each other so as to conjointly define a weir between said settling chamber of said first stage and said mixing chamber of said second stage;

solvent metering means for metering a solvent to be washed to the mixing chamber of the first stage as one of the phases;

metering means for metering a first aqueous washing solution into the first stage in the mixing chamber thereof as the other one of the phases;

said one phase being lighter than said other phase and said weir having an elevation effective for facilitating transport of said one phase over said weir into said mixing chamber of said second stage;

each of said stages having a partition wall for separating the mixing chamber thereof from the settling chamber thereof;

each of said stages including a recycling conduit extending through said respective partition walls, said conduits each having a first end in the respective mixing chamber and a second end in the respective settling chamber in said other one of said phase;

pH sensor means mounted in said first stage mixing chamber for measuring pH values of a dispersion of said phases in said mixing chamber of the first stage to obtain a signal indicative of the pH values of the dispersion;

controller means for controlling quantities of the first aqueous washing solution metered to the mixing chamber of the first stage in response to said signal for maintaining said pH-value within a predetermined range; and aqueous metering means for metering a second aqueous washing solution into the second stage in the mixing chamber thereof for neutralizing the solution which has been subjected to washing by said first aqueous washing solution.

7. The apparatus of claim 6, said controller means comprising: a comparative electrically connected to said pH sensor means for receiving said sensor signal and generating a control signal in response to a deviation of said pH values out of said range; and, metering pump means connected between said aqueous washing solution supply means and said mixing chamber and being controlled by said control signal for metering the aqueous washing solution to said mixing chamber to maintain said pH values within said range.

8. The apparatus of claim 6, including a stirrer assembly mounted in said first stage mixing chamber for mixing the solvent phase and the aqueous washing solution phase with a further recycled aqueous phase, the stirrer assembly including:

a head mounted at the bottom of said mixing chamber and being adapted to receive all of said phases;

said head including a diffuser for discharging all of said phases into said mixing chamber; and, stirrer means rotatably journalled in said mixing chamber and coacting with said diffuser for mixing said all of phases in said mixing chamber.

9. The apparatus of claim 8, said stirrer means including a shaft and a first stirrer mounted on said shaft within said diffuser for mixing and forcing said phases through said diffuser.

10. The apparatus of claim 9, said stirrer means including a second stirrer mounted on said shaft above said first stirrer for effecting mixing of said phases in the upper region of said mixing chamber.

11. The apparatus of claim 9, said one phase and said other phase conjointly defining an interface in said first stage settling chamber, said mixer-settler having a partition wall formed therein for partitioning said mixing chamber from said settling chamber; and, said partition wall having a mixed phase weir formed therein above said interface.

12. The apparatus of claim 11, said weir being formed as an opening in said partition wall having a weir pass-through cross section; said apparatus further including lines for conducting all of said phases to said head; said recycling conduit being connected to said head; said lines and said conduit all having respective cross section; and, said cross sections all being selected in dependence upon the throughput through said mixer-settler so as to cause an internal phase ratio between the solvent and the first washing portion to be approximately 1:1.

13. The apparatus of claim 6, further comprising: stirring means mounted in the mixing chamber of each stage for stirring said phase in said mixing chamber; and, said pH sensor means being mounted in the immediate vicinity of said stirring means in said first stage mixing chamber.

14. The apparatus of claim 6, further comprising stirring means mounted in the mixing chamber of each of said stages for stirring said phases in said mixing chamber; and, said first end of each of said conduits being arranged below said respective stirring means.

15. Apparatus for washing an organic solvent in the reprocessing of irradiated nuclear fuel, the apparatus comprising:

a mixer-settler having first and second stages wherein two phases are mixed;

said first mixer-settler stage including a mixing chamber and a settling chamber and said second mixer-settler stage also including a mixing chamber an a settling chamber;

said first and second stages arranged next to each other so as to conjointly define a weir between said settling chamber of said first stage and said mixing chamber of said second stage;

solvent metering means for metering solvent to be washed to the mixing chamber of the first stage as one of the phases;

metering means for metering a first aqueous washing solution into the first stage in the mixing chamber thereof as the other one of the phases;

said one phase being lighter than said other phase and said weir having an elevation effective for facilitating the transport of said one phase over said weir into said mixing chamber of said second stage;

each of said stages having a partition wall for separating the mixing chamber thereof from the settling chamber thereof;

each of said stages including a recycling conduit extending through said respective partition wall;

said conduits each having a first end in the respective mixing chamber and a second end in the respective settling chamber in said other one of said phases;

pH sensor means mounted in said first stage mixing chamber for measuring pH values of a dispersion of said phases in said mixing chamber of the first stage to obtain a signal indicative of the pH values of the dispersion;

controller means for controlling quantities of the first aqueous washing solution metered to the mixing chamber of the first stage in response to said signal for maintaining said pH-value within a predetermined range;

aqueous metering means for metering a second aqueous washing solution into the second stage in the mixing chamber thereof for neutralizing the solution which has been subjected to washing by said first aqueous washing solution;

the mixing chamber of each of said stages defining a substantially enclosed space;

stirring means mounted within the enclosed space of each of said stages for stirring said phases in said mixing chamber; and, said pH sensor means being disposed in said enclosed space of said first stage mixing chamber adjacent said stirring means.

* * * * *

UNITED STATES PATENT AND TRADEMARK OFFICE

CERTIFICATE OF CORRECTION

PATENT NO. : 5,104,524

DATED : April 14, 1992

INVENTOR(S) : Klaus Eiben and Heinz Evers

It is certified that error appears in the above-identified patent and that said Letters Patent is hereby corrected as shown below:

In column 4, line 15: delete "allow" and substitute -- show -- therefor.

In column 4, line 16: delete "IV-13IV" and substitute -- IV-IV -- therefor.

In column 4, line 44: delete "ph" and substitute -- pH -- therefor.

In column 4, line 49: delete "ph" and substitute -- pH -- therefor.

In column 7, line 17: delete "solution" and substitute -- solutions -- therefor.

In column 7, line 62: delete "," and substitute -- ; -- therefor.

In column 7, line 65: delete "phase," and substitute -- phases; -- therefor.

In column 8, line 3: between "controlling" and "quantities", insert -- the --.

In column 8, line 7: after "and", insert -- , --.

UNITED STATES PATENT AND TRADEMARK OFFICE

CERTIFICATE OF CORRECTION

PATENT NO. : 5,104,524

DATED : April 14, 1992

INVENTOR(S) : Klaus Eiben and Heinz Evers

It is certified that error appears in the above-identified patent and that said Letters Patent is hereby corrected as shown below:

In column 8, line 14: delete "comparative" and substitute -- comparator -- therefor.

In column 8, line 34: delete "said" (first occurrence).

In column 8, line 34: between "of" and "phases", insert -- said --.

In column 8, line 59: delete "portion" and substitute -- solution -- therefor.

In column 8, line 63: delete "phase" and substitute -- phases -- therefor.

In column 9, line 11: delete "an" and substitute -- and -- therefor.

UNITED STATES PATENT AND TRADEMARK OFFICE
CERTIFICATE OF CORRECTION

PATENT NO. : 5,104,524

DATED : April 14, 1992

INVENTOR(S) : Klaus Eiben and Heinz Evers

It is certified that error appears in the above-identified patent and that said Letters Patent is hereby corrected as shown below:

In column 9, line 21: delete "in" and substitute -- at -- therefor.

In column 10, line 2: delete "wall" and substitute -- walls -- therefor.

In column 10, line 11: between "controlling" and "quantities", insert -- the --.

Signed and Sealed this

Seventeenth Day of August, 1993

Attest:

BRUCE LEHMAN

Attesting Officer

Commissioner of Patents and Trademarks